Dec. 22, 1953 — H. B. RAPP ET AL — 2,663,239
POWER LIFT TRACTOR HITCH FOR EARTH WORKING IMPLEMENTS
Filed Dec. 11, 1946 — 4 Sheets-Sheet 2

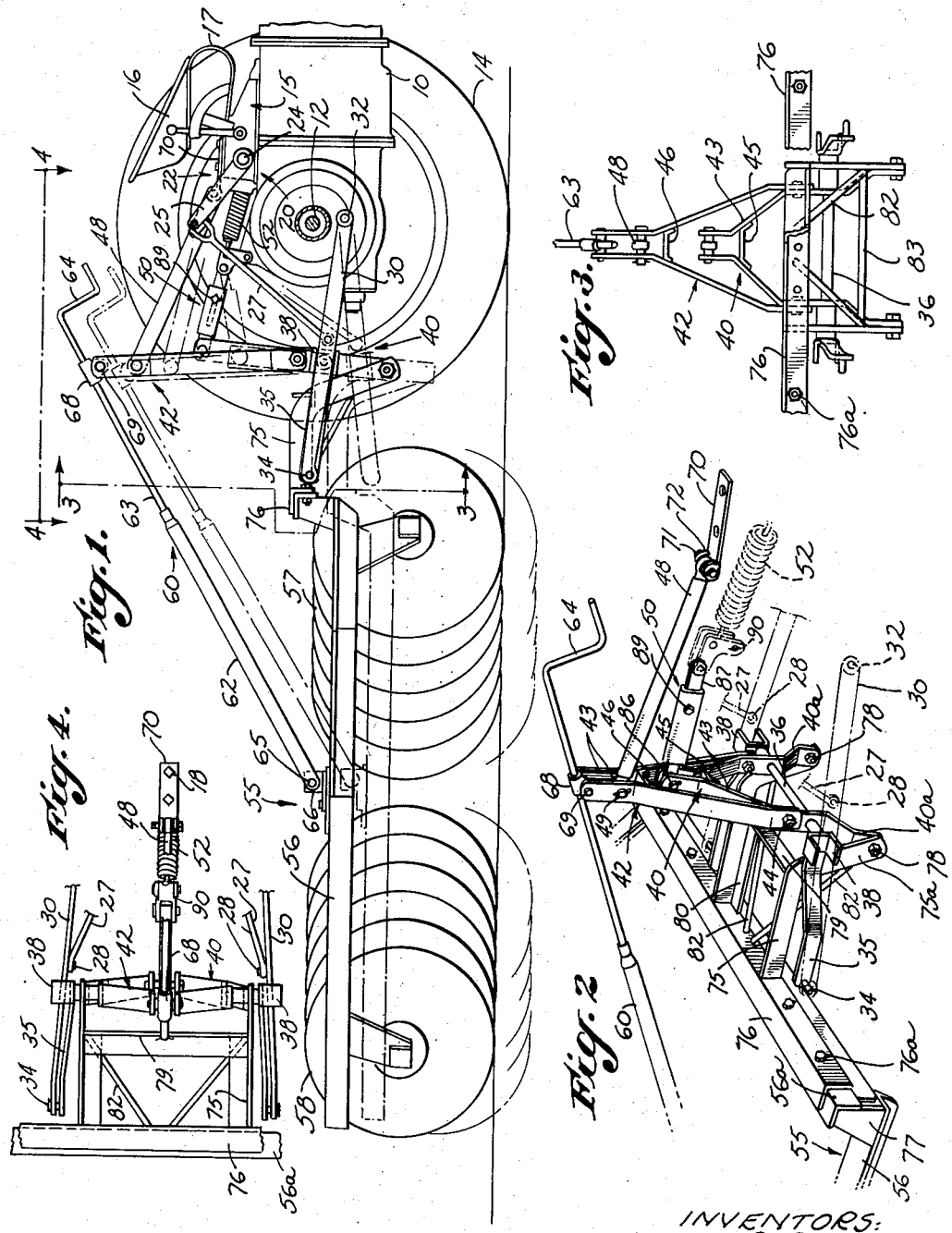

INVENTORS:
HOWARD B. RAPP,
LOYD E. HECKATHORN,
BY THIER ATTORNEYS
HARRIS, KIECH, FOSTER & HARRIS,

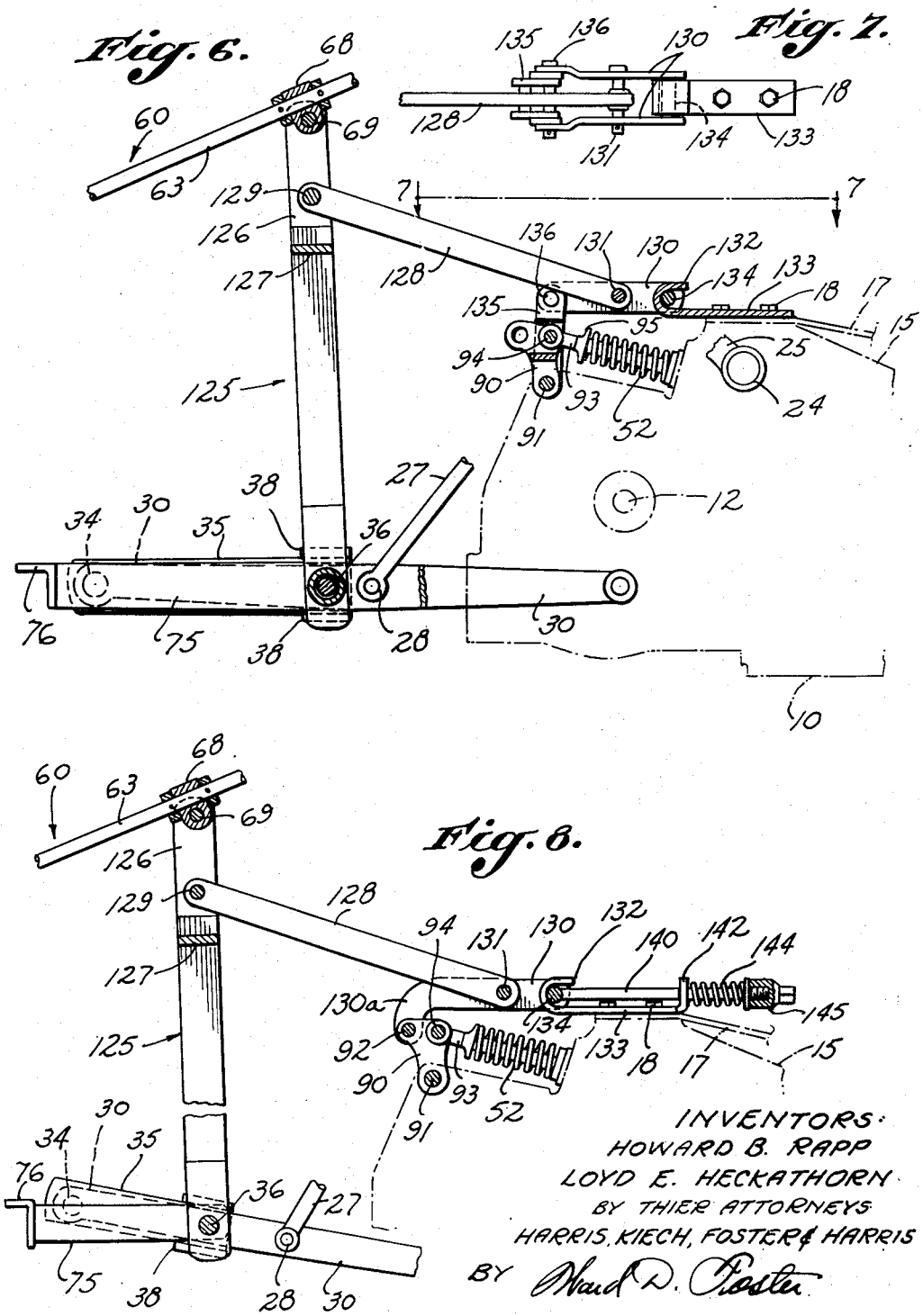

Dec. 22, 1953    H. B. RAPP ET AL    2,663,239
POWER LIFT TRACTOR HITCH FOR EARTH WORKING IMPLEMENTS
Filed Dec. 11, 1946    4 Sheets-Sheet 4
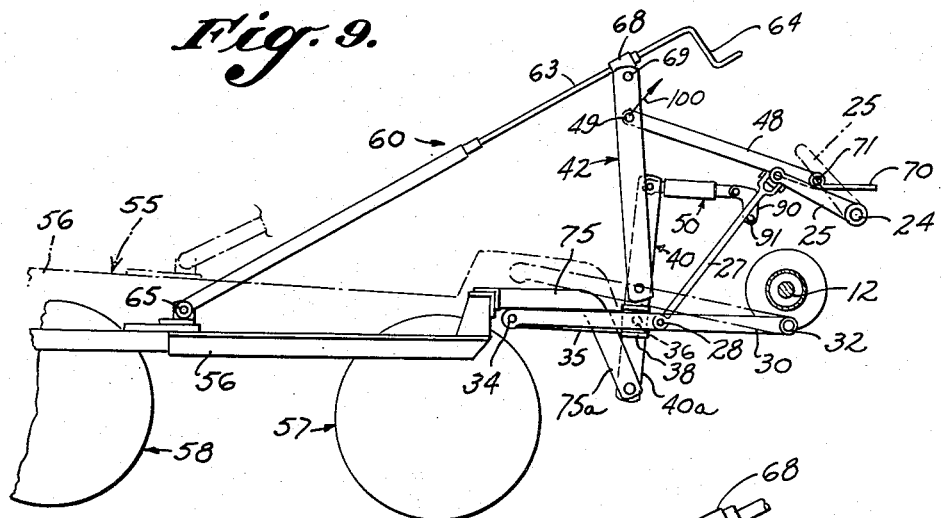
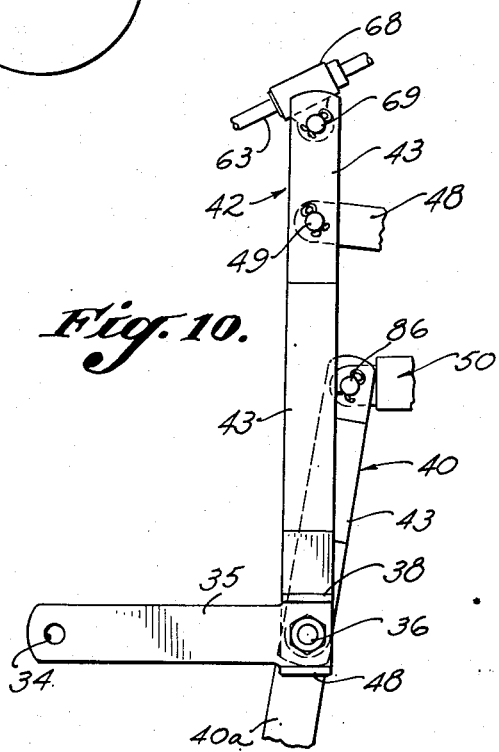
INVENTORS:
HOWARD B. RAPP,
LOYD E. HECKATHORN,
BY THIER ATTORNEYS
HARRIS, KIECH, FOSTER & HARRIS Patented Dec. 22, 1953

2,663,239

UNITED STATES PATENT OFFICE 2,663,239

POWER-LIFT TRACTOR HITCH FOR EARTH WORKING IMPLEMENTS

Howard B. Rapp, Santa Ana, and Loyd E. Heckathorn, Garden Grove, Calif., assignors to Towner Manufacturing Co., Santa Ana, Calif., a partnership Application December 11, 1946, Serial No. 715,450

8 Claims. (Cl. 97—46.07)

Our invention relates to structures for pulling and for regulating the penetration of earth working implements into the soil and for otherwise controlling their position during use or transport by automotive tractors.

A particular object of the invention is to provide hitch means and regulating means to be used in conjunction therewith which will provide for ready adaptation of a tractor having automatic power-lift mechanism to the handling of implements of varying overhanging weights, that is, of variable weights disposed at the rear of the tractor behind the automatic lifting mechanism. Disc harrows may be considered as examples of the earth working tools, and automatic power-lift devices are represented by those known in the trade as Ford-Ferguson tractors and generally disclosed in the Ferguson Patents Nos. 2,118,180 and 2,118,181. Such devices and implements are used herein for the purpose of illustration, but it will be apparent that the invention may be employed in connection with other implements and devices. Implements which are inherently heavy, such as large disc harrows of the offset type, are particularly adapted to use with the present invention, as are implements that are heavy when loaded, such as bucket scrapers and similar structures.

Heretofore, control devices have been employed upon tractors for the purpose of automatically controlling the depth of cut of earth working implements drawn by the tractors, and also for the purpose of elevating such implements to an inoperative position for transportation. In general, such devices have been thoroughly satisfactory only when relatively light implements, such as plows, cultivators, and small harrows, have been used with them. However, when heavy implements, such as the large disc harrows and the like above indicated, have been employed, the automatic controlling devices have not been entirely satisfactory because of the inadaptability of the control devices to care for such comparatively heavy weights. Yet, to insure desirable penetration of the discs of a disc harrow into the soil, the harrow should be of substantial weight. Consequently, it is desirable to provide controls and hitch connections which will handle both light-weight implements and heavy implements.

It is therefore a particular object of our present invention to provide a hitch connection for tractors having automatic power-lifts which will adapt such power-lifts to the handling of implements of substantial weight as well as implements of relatively light weight.

It is a further object of this invention to provide a hitch structure for connecting earth working implements, such as disc harrows, to tractors having automatic power-lift mechanisms so that most favorable leverages may be employed in conjunction with such automatic power-lift mechanisms to enable them to handle and control the earth working implements in a proper and satisfactory manner. This object extends both to the handling and control of such implements during earth working operations, and to their elevation into inoperative position for the purpose of transport.

Another important object of the invention is to provide in such a tractor hitch means which will transmit a portion of the weight of the implement directly to the framework of the tractor, so that only a portion of such weight is required to be lifted by the power-lift mechanism, the draft reaction of the drawn implement being, however, directly applied to the automatic power-lift mechanism for automatic lifting and lowering of the implement in accordance with draft effects.

It is also an object of the invention to provide a device having the stated characteristics which is useful to accomplish the stated purposes, regardless of whether the implement is comparatively light-weight or is relatively much heavier.

It is a further object of the invention to provide a hitch to be used with heavy implements and in conjunction with automatic power-lifts on tractors which will under normal operating conditions support a substantial proportion of the weight of the implement directly upon the tractor, draft-reaction forces which tend to produce a forward thrust during operation of the implement, as by elevation of a portion of the implement by the earth upon which it operates, serving to actuate the controls of the automatic power-lift so that the latter will sufficiently lift the implement to relieve undue strains and power requirements of the tractor due to resistance to forward movement.

Other objects and aspects of the invention will become apparent to those skilled in the art upon reference to the accompanying drawings and the following specification wherein certain embodiments are disclosed by way of illustration.

In the drawings,

Fig. 1 is a side elevation of a hitch of this invention shown in operative relation with a heavy disc harrow and a tractor provided with the previously mentioned type of automatic power-lift mechanism, the hitch and harrow being shown by broken lines in a lowered, operative position;

Fig. 2 is a fragmentary perspective of the combination shown in Fig. 1, and illustrates principally the hitch mechanism itself;

Fig. 3 is a rear elevation of the hitch mechanism, parts being shown in section, this view being indicated by the line 3—3 of Fig. 1;

Fig. 4 is a fragmentary plan of the hitch mechanism shown in the perspective view of Fig. 2, and indicated by the line 4—4 of Fig. 1;

Fig. 6 is a vertical longitudinal section taken approximately on the median line of the apparatus, and showing a modified form of hitch mechanism;

Fig. 7 is a partial plan view of the hitch shown in Fig. 6, as indicated by the line 7—7 of Fig. 6;

Fig. 8 is a view similar to that of Fig. 6, indicating a still further modified form of hitch mechanism;

Figure 5:
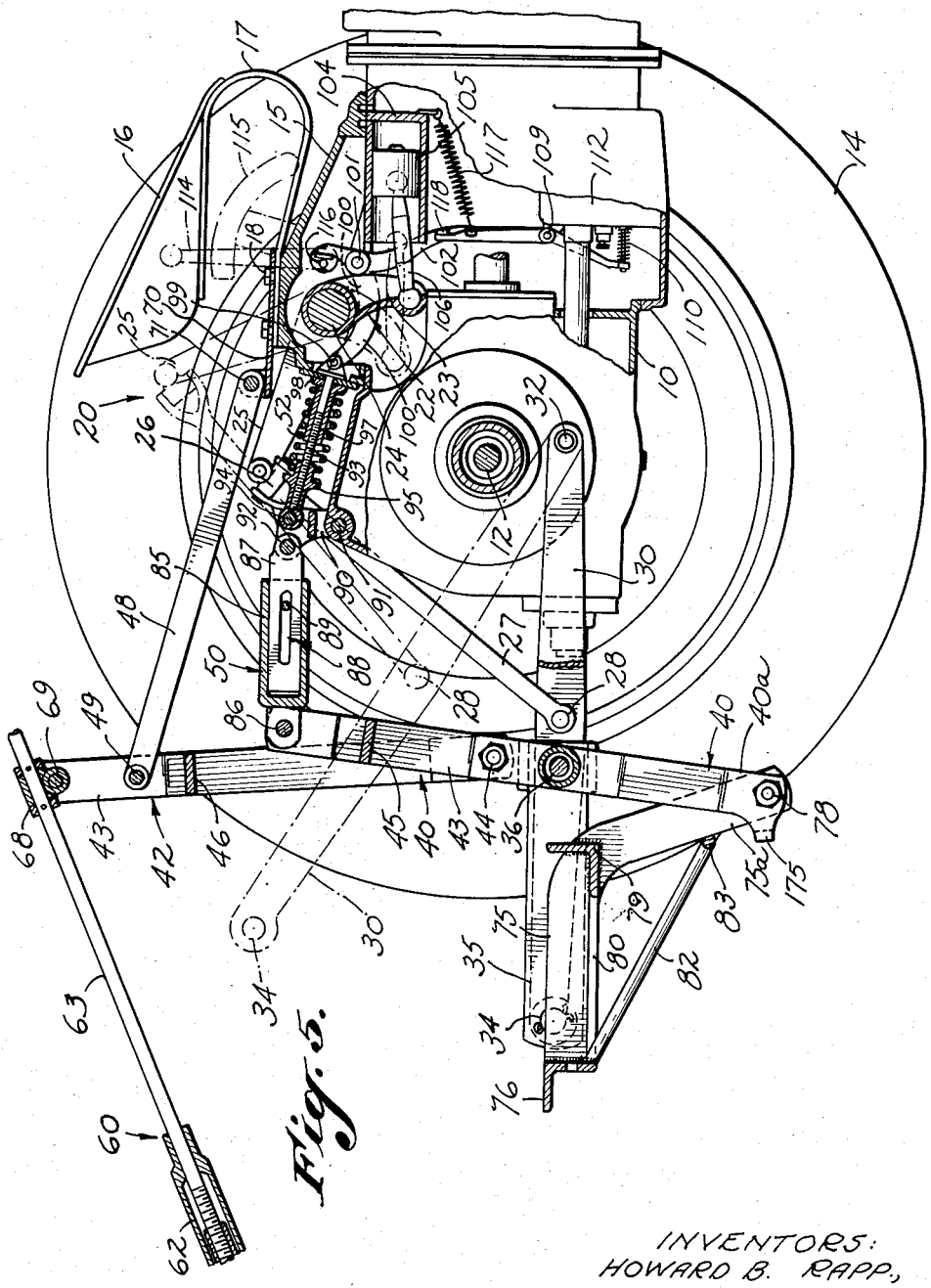
Fig. 5 is an enlarged scale view, partly in side elevation and partly in vertical section, showing the hitch mechanism and also showing in more or less detail the previously mentioned Ford-Ferguson type of automatic power-lift such as illustrated in the listed Ferguson patents.

Fig. 9 is an elevational diagrammatic view, from which a number of the parts are omitted, the purpose of this view being to indicate the relative points of attachment of the present improvement to a tractor upon which it is employed and also to indicate certain relationships in connection with operational movements; and Fig. 10 is a detail on an enlarged scale showing a modified form of mounting for the double A-frame construction of the form of Figs. 1 to 5.

Referring to the drawings, and particularly to that form of the invention which is illustrated in Figs. 1 to 5, there is shown a conventional type of tractor comprising a frame 10 having a rear axle 12 carrying at its opposite ends rear wheels 14. The upper portion of the frame 10 constitutes a superstructure which includes a portion 15 upon which is normally mounted a conventional seat 16 supported by a U-shaped leaf spring 17 secured by screws 18 to the top of the superstructure portion 15.

The superstructure portion 15 and the frame 10 contain an automatic power-lift mechanism generally indicated at 20 and shown in considerable detail in Fig. 5. This automatic power-lift mechanism, which as illustrated is substantially the same as that shown in the above mentioned Ferguson Patents Nos. 2,118,180 and 2,118,181, includes a lifting lever 22 having a lower arm 23 disposed within the mentioned superstructure, and fixed upon a transverse shaft 24 bifurcated at its opposite ends to provide two exposed lifting arms 25. The upper ends of the lifting arms 25 are connected by universal joints 26 with elevating pull rods 27 whose lower ends are pivotally connected at 28 to elevator levers 30. The pull rods 27 in conjunction with the lever arms 25 thus act as elevators for the elevator levers 30. The elevator levers 30 have their forward ends mounted by means of pivots 32 upon adjacent side portions of the tractor frame 10 and thereby also constitute draft arms. The elevating mechanism is automatically actuated by mechanism shown in Fig. 5 and later to be described in connection with the functioning of various parts of the hitch.

The rearward ends of the elevator levers 30 are pivotally mounted upon pins 34 which are carried upon the rearward ends of return arms 35 (see Figs. 2 and 5) whose forward ends are secured upon the outer ends of a transverse draft bar 36. Such forward ends of the return arms 35 are provided with a pair of outwardly directed, integrally attached lifting lugs 38 between which intermediate portions of the respective elevator levers 30 are disposed, these portions of the levers 30 being immediately rearward of the pivot points 28 by which the pull rods 27 are attached to the levers 30. In this manner the lifting effect produced by the pull rods 27 upon the elevator levers 30 is applied to the draft bar 36 close to the lifting points provided by the pivots 28. Such points of connection, which may be at approximately the halfway points along the levers 30, provide for the disposition of the lifting region well forward of the harrow between the rear wheels 14 and toward the rear axle 12 in the tractor frame 10. Inasmuch as the elevator levers 30, the pull rods 27, and the described lifting mechanism including the lifting lever 22 are original equipment on a tractor, the indicated construction of the hitch provides for convenient attachment of the hitch while at the same time bringing the draft bar 36 forward as far as possible and well beyond the pivot points provided by the pins 34. Thus, the power required in the power-lift mechanism to lift a given weight is minimized.

Thus far, the structure described for the form of Figs. 1 to 5 in the same as employed in connection with the forms of Figs. 6 to 8. In the form of Figs. 1 to 5, the transverse draft bar 36 carries a lower and inner framework 40 of a type common in this art and generally referred to as an A-frame. The A-frame 40 in turn carries an upper and outer A-frame 42. Each of the A-frames 40 and 42 comprises a pair of spaced upstanding legs 43 which diverge as they extend downward, the lower ends of the legs 43 of the upper and outer A-frame 42 being pivoted on the lower diverging portions of the legs 43 of the A-frame 40 by means of bolts 44. The pivots provided by the bolts 44 thus lie somewhat above the pivot points provided for the A-frame 40 by the transverse draft bar 36. The described arrangement of the two A-frames 40 and 42 serves to provide a two-member framework through the medium of which the movements of the implement to be drawn are controlled. The lower or cross bar portion of the A-frame 40 is provided by the draft bar 36, and the lower portion of the A-frame 42 is in turn provided by the A-frame 40 and the pivot bolts 44. The narrower, upper portions of each of the A-frames 40 and 42 are properly spaced by means of spreaders 45 and 46, respectively. Above the spreader 46 of the A-frame 42 and between the upper portions of the corresponding legs the rearward end of a rigid top link or supporting tension link 48 is pivotally mounted upon a pivot pin 49, and above the spreader 45 of the lower A-frame 40 a thrust link 50 is positioned, the thrust link 50 being connected with a heavy spring 52 constituting a part of the automatic control of the power-lift mechanism 20, as later to be described.

The present hitch mechanism is adapted for attachment of implements considerably heavier than those for which the automatic power-lift mechanism 20 was originally designed, as previously indicated. In the present instance, a disc harrow 55 is employed for the purpose of illustration, this harrow comprising any type of harrow frame 56 having a forward gang of discs 57 and a rearward gang of discs 58 of conventional type, as best indicated in Fig. 1 where the parts are shown by solid lines in position resting upon a roadway and by broken lines in an earth-penetrating position such as assumed during discing operations. The harrow 55, being heavier than normal, is so connected with the previously mentioned superstructure of the tractor that an appreciable proportion of its overhanging or rearward weight is transferred to the tractor superstructure. This is accomplished through the medium of an extensible rod structure 60 which constitutes a supporting link and comprises an internally threaded sleeve 62 which receives an externally threaded shaft 63, on the forward end of which a hand crank 64 is provided. The lower end of the sleeve 62 is mounted on a pivot 65 carried in a bracket 66 upon the top of a transverse middle portion 67 of the harrow frame 56. The upper end of the shaft 63 is rotatably secured in a bearing 68 mounted upon a trunnion 69 between the upper extremities of the legs 43 of the upper A-frame 42. By actuation of the crank 64, the rod structure 60 may have its length adjusted as required, whereby to elevate the rearward gang of discs 58 as required with respect to the forward gang of discs 57, the corresponding weight being transmitted to the framework comprising the A-frames 40 and 42 and a portion thereof being transmitted through the rigid top link 48 to the superstructure of the tractor, and particularly to the portion 15 of the superstructure. To effect this result, the forward end of the top link 48 is pivotally mounted upon a bracket plate 70 by a pivot pin 71 carried between ears 72 on the rearward end of the bracket plate 70. The bracket plate 70 is secured, as shown, to the superstructure of the tractor frame 10 through the medium of the screws 18 by which the seat spring 17 is attached, this being a convenient method of mounting on tractors of this type, and this mounting serving also to place the attachment pin 71 forward of the axle 12 and forward of the pivots 32 for the elevator levers 30.

The forward portion of the frame 56 of the harrow 55 is connected for draft through the lower A-frame 40 by means of bent, forwardly extending, rigid draft arms 75 whose rearward ends are welded to an angle iron 76 secured by bolts 76a to an angle iron 56a which constitutes the forward portion of the frame 56 and is secured to the side members thereof as by means of appropriate brackets 77. The forward ends 75a of the bent draft arms 75 project downward and are connected by means of pivot bolts 78 to lower depending ends 40a of the legs 43 of the lower A-frame 40. Since such ends 40a lie below the transverse draft bar 36, the resistance of the harrow 55 to forward movement creates a rearward pull upon the lower ends 40a of the A-frame 40 and a consequent forward thrust of the upper end of the lower A-frame 40 which is transmitted to the thrust link 50 and thence to the spring 52 and associated parts of the control device for the automatic power-lift mechanism 20.

Between the draft arms 75, a brace bar 79 is disposed, the arms 75 being shown as formed of angle material for additional bracing and for the further purpose of constituting a weight box to receive a weight upon the horizontal members of the angle material, designated 80, should additional weight be required to effect desired earth penetration by the forward harrow discs 57. Further bracing of drafts arms 75 is effected by angularly disposed brace rods 82 extending between the angle iron 76 of the harrow frame 56 and the lower forward ends 75a of the arms 75, and additional lateral bracing between such lower ends is provided by a rod member 83 connecting the forward ends of the brace rods 82.

In the functioning of the hitch disclosed in Figs. 1 to 5, the pivot bolts 44, by which the upper outer A-frame 42 is mounted upon the lower inner A-frame 40, serve as support means by which part of the rearward weight of the harrow 55 taken through the rod structure 60 is transferred to the lower A-frame 40 and thence to the transverse draft bar 36, the lugs 30, and the elevator levers 30. The remainder of the rearward weight of the harrow taken through the rod structure 60 is transferred through the top link 48 to the superstructure at the top of the tractor frame 10, as previously disclosed. As the harrow 55 is drawn forward by the described tractor, the resistance of the harrow to forward movement is transmitted through the draft arms 75 to the lower ends 40a of the legs 43 of the lower A-frame 40, the latter therefore tending to rock upon the draft bar 36 and to force the upper end of the lower A-frame 40 and the thrust link 50 forward. Thus, the draft reactions of the harrow 55 are taken by the thrust link 50 and a part of the overhanging weight of the rearward portion of the harrow 55 is transferred through the top link 48 to the tractor frame and is supported thereby. At the same time, the top link 48 resists any tendency of the upper A-frame 42 to rock forward under the influence of any weight carried in the weight-box between the draft arms 75. In this manner, any weight applied to the forward gang of discs 57 by way of the weight-box is caused to be properly applied without interfering with the proper functioning of any portion of the framework constituted by the double A-frame which the A-frames 40 and 42 form, and any buckling that might occur if the top link 48 was flexible is avoided. By the construction disclosed, all of these parts are located very close to the rear axle 12 of the tractor and to the usual differential housing disposed thereabout and carried at the rear end of the tractor frame 10. At the same time, the improved mechanical advantage previously described is obtained whereby the lifting points on the elevator levers 30 are disposed closely adjacent the double A-frame and the weights to be lifted.

The thrust link 50, by which the resistance to forward movement is communicated through the top of the lower A-frame 40 to the compression spring 52 of the control device for the automatic power lift 20, is telescopic in order to provide for elevation of the operative parts into a transport position higher than the position shown in Fig. 1, and corresponding with the broken-line position of the elevator levers 30, of Fig. 5. When in such elevated position, the rearward end of the thrust link 50 and the adjacent upper end of the A-frame 40 will assume a sharply elevated position from the full line position of Fig. 5, thereby requiring the considerable extension of some element. This is accomplished through the medium of an elongated sleeve 85 constituting the outer member of the thrust link 50, the rearward end of the sleeve 85 being pivoted through the medium of a pivot pin 86 upon the upper extremity of the A-frame 40. Within the sleeve 85, a slidable telescoping link member 87 is disposed. The link member 87 is provided with a lost-motion slot 88 in which is positioned a transverse stop pin in the form of a cross bolt 89 fixed in the sleeve 85. Upon elevation of the parts into the mentioned transport position, the bolt 89 travels into the rearward end of the slot 88, and when the parts are lowered, the bolt 89 travels into the forward portion of the slot 88 as seen in Fig. 5. When the upper end of the A-frame 40 is moved forward by draft reaction of the draft arm 75 on the lower end of the A-frame 40, the bolt 89 moves to the forward portion of the slot 88, and the rearward extremity of the link member 87 is engaged by the bottom of the socket of the sleeve 85 to produce the required forward thrust. Such thrust is transmitted by the link member 87 to a bell crank 90 whose lower end is pivoted at 91 upon an adjacent upper rearward corner of the tractor frame 10, this point being normally slightly rearward of the axle 12 and the pivots 32 for the elevator levers 30, and also being rearward of the universal joints 26 on the lifting arms 25 and the pivot pin 71 by which the top link 48 is connected with the bracket plate 70.

The thrust from the link member 50 is effected through a pivot pin 92 carried by the upper end of the bell crank 90, which in turn transmits the thrust to a control rod 93 whose outer end in turn is attached to the bell crank 90 by a pivot pin 94. The control rod 93 carries a collar 95 bearing against the earlier mentioned compression spring 52, which spring resists the thrust being transmitted through the thrust link 50. The opposite end of the spring 52 is disposed around a guide sleeve 97 through which the control rod 93 passes to the interior of the tractor frame 10, the guide sleeve 97 having a collar 98 upon which the adjacent end of the spring 52 bears, the position of the sleeve 97 and its collar 98 being maintained against the adjacent portion 15 of the superstructure on the tractor frame 10. Within a cavity within the super-structure portion 15, the inner end of the control rod 93 reciprocates, such inner end being connected by a pivot 99 to an adjacent end of a curved control link 100 whose opposite end is connected to a movable pivot 101 carried by a control lever 102. The function of these parts is to control automatically, under actuation by the control rod 93, the passage of hydraulic liquid to the interior of a cylinder 104 in which a piston 105 reciprocates for the purpose of moving a piston rod 106 connected to the lower end of the arm 23 of the lifting lever 22 disposed on the shaft 24 which operates the exposed lifting arms 25, which in turn actuate the pull rods 27 and elevator levers 30 in accordance with the shifting of the movable pivot 101 and of the control lever 102 through the medium of the thrust link 50. In this specific construction, which is substantially that currently employed on standard Ford-Ferguson tractors, the control lever 102 cooperates with an auxiliary lever 108 pivoted at 109 and controlling a valve 110 regulating passage of hydraulic fluid from a pump 112 to and from the cylinder 104 by conventional fluid lines (not shown). In this particular form of lift mechanism a quadrant control lever 114 is employed whose upper end is positioned adjacent the driver's seat 16 and works along a conventional quadrant 115. The lower end of the quadrant lever 114 is pivoted upon the side of the portion 15 of the superstructure and carries an eccentrically located fulcrum 116 for the control lever 102, the fulcrum 116 bearing upon an appropriate face at the upper end of the lever 102. A spring 117 is attached to a portion of the auxiliary lever 108 to cause the latter to bear continuously against a stop 118 on the lower end of the control lever 102. This spring serves not only to control the lever 108 and the valve 110, but serves also to force the upper end of the control lever 102 against the movable eccentric fulcrum 116 regardless of the position of the movable pivot 101. Thus, when the eccentric fulcrum 116 is moved by manual actuation of the quadrant lever 114, the control lever 102 is correspondingly shifted, and, likewise as the movable pivot 101 is shifted through movement of the thrust link 50, the control rod 93 and the curved control link 100, the lower end of the control lever 102 and the stop 118 are correspondingly shifted. In this manner the valve 110 is actuated automatically to cause the lifting lever 22 and its lifting arms 25 to operate automatically in accordance with draft reactions of the harrow 55 (or other implement being drawn), and also in accordance with the desires of the tractor driver in the seat 16. While the Ford-Ferguson type of automatic power-lift mechanism is here described for the purposes of completeness, it is apparent that any other specific control and actuating means may be operated through the medium of the control rod 93 working against the compression spring 52 to effect the required movement of the lifting arms 25.

To summarize the operation of the entire structure disclosed in Figs. 1 to 5, resistance to the forward draft movement in the earth, developed by the harrow 55, is transmitted through the draft arms 75 to the lower extremities 40a of the legs 43 of the lower A-frame 40, thereby producing a corresponding thrust upon the thrust link 50, which thrust is transmitted through the control rod 93 against the strong compression spring 52 to effect automatic actuation as just described above. The overhanging weight of the rear portion of the harrow 55, which is transmitted through the adjustable rod structure 60 to the top of the upper A-frame 42 by way of the bearing 68 and trunnion 69, is partially transferred to the super-structure of the tractor frame 10 by means of the rigid connecting link 48 attached to the upper end of the upper A-frame 42 and to the bracket plate 70 carried by the aforesaid superstructure of the tractor. This link 48 also resists any jackknifing or buckling tendencies and maintains the upper A-frame 42 substantially in a constant relationship to the tractor frame for any given position of elevation of the parts. The required proportioning of the harrow weight transmitted to the earth through the respective forward gang of discs 57 and rearward gang of discs 58 is accomplished by the tractor driver from his seat 16 through the hand crank 64 which extends or shortens the rod structure 60 as desired. Proper proportioning of the weight in this manner regulates the draft effects on the two disc gangs so that all tendency toward side draft is eliminated.

Thus, when draft reactions of the harrow 55, created by resistance to forward movement, are sufficient to cause the draft arms 75 to swing the lower A-frame 40 about the draft bar 36 and in turn cause the thrust link 50 and control rod 93 to compress the control spring 52, hydraulic fluid is passed to the cylinder 104 by the valve 110 to actuate the piston 105 and cause a corresponding lifting effect to be transmitted to the elevator levers 30 by the lifting arms 25 and the pull rods 27. Such actuation results in partial elevation of the harrow 55, the elevation becoming greater as the resistance to forward draft increases. Since a substantial proportion of the weight of the harrow 55 is transferred through the rod structure 60 and the top link 48 to the superstructure of the tractor frame 10 by way of the bracket plate 70, much less lifting force is required of the automatic power-lift mechanism 20, including the piston 105, than would otherwise be required. Also, such force is reduced by reason of the forward location of the lifting lugs 38. As a result of these conditions, the lifting pressure required in the hydraulic-lift system may be reduced, for a 1200 pound harrow, for example, by as much as 250 to 350 pounds, thereby adapting a smaller tractor unit to the handling of much heavier harrows and other implements than those for which it was originally designed. This result is largely accomplished by the described system for transferring weight directly to the upper part of the tractor frame.

With the construction shown, the draft arms 75, the lower extremities 40a of the lower A-frame 40, the draft bar 36, the lugs 38 and the return arms 35 constitute a linkage by which the implement is connected to the automatic power-lift mechanism 20. Also, the adjustable rod structure 60, the top link 48, the upper portion of the upper A-frame 42, and the bracket plate 70 constitute a linkage by which the mentioned portion of the implement weight is supported directly by the upper portion of the tractor frame. The lower A-frame 40 also serves as a draft reaction transmitting frame, in view of its actuation of the thrust link 50, and the double A-frame provided by the two A-frames 40 and 42 serves as an implement or weight lifting frame in view of its association with the linkage members 48 and 60. The top link 48 and the bracket plate 70 together with the connections 18, 49 and 71 may be considered a linkage between the A-frame 42 and the tractor frame, and, similarly, the adjustable rod structure 60, including the parts 62 and 63 and their connections to the implement 55 and the A-frame 42, may be considered a linkage between the implement and the A-frame 42, as well as the linkage means indirectly connecting the rear of the implement, by way of the A-frame 42, to the tractor frame. Also, the parts 85 and 87 (the thrust link 50) constitute a linkage between the frame structure provided by the two A-frames and the power lift of the tractor, such linkage transmitting draft reactions from the implement 55 to the automatic control of the power lift mechanism. This terminology applies regardless of whether the A-frame 40 and the control rod 93 be considered a part of such linkage or not.

In the forms shown in Figs. 6, 7, and 8, the double A-frame of the form of Figs. 1 to 5 is replaced by a single A-frame 125. In these instances, the A-frames are constructed of two upright legs 126 whose lower portions are mounted upon the transverse draft bar 36 and whose upper portions are connected by a short spreader 127. Also, the draft arms 75 are straight and have their forward ends attached to the draft bar 36. In connection with both of the A-frames 125, a top link 128, corresponding with the top link 48 of the form of Figs. 1 to 5, is employed, this link 128 being mounted upon a pivot pin 129 carried in the upper portion of the A-frame, the opposite or forward end of each link 128 being connected to a double-bar thrust link 130 by a pivot pin 131. The forward end of the thrust link 130 is movably connected to a hook 132 carried upon a bracket plate 133 corresponding with the bracket plate 70 of the other form and secured to the upper portion 15 of the superstructure of the tractor frame 10 by means of the same screws 18 which anchor the leaf spring 17 supporting the driver's seat.

The movable connection of the forward end of the thrust link 130 with the hook 132 is effected through the medium of a cross-pin 134 which spans the two spaced elements of the thrust link 130 as best indicated in Fig. 7.

In the form of Figs. 6 and 7, the rearward end of the thrust link 130 is connected with upstanding extensions 135 welded to the top of the bell crank 90, thus constituting a lever fulcrumed at 91 to work on the pivot 94, a pivot pin 136 extending through the rearward ends of the members of the thrust link 130 and through the upstanding extensions 135. The connection of the control rod 93 of the control mechanism for the automatic power lift is the same as in the form shown in Fig. 5, the same compression spring 52 being employed and the same pivotal mountings 91 and 94 also being used.

In conjunction with the operation of the modification of Fig. 6, the overhanging weight of the harrow, carried by the adjustable rod structure 60 through the medium of the bearing 68 and the trunnion 69 at the top of the A-frame, is supported from hook 132 of the bracket plate 133 in the same manner that the overhanging weight of the harrow is supported by the bracket plate 70 of the form of Fig. 5. When the draft reactions of the harrow, which are transmitted by a buckling tendency of the rod structure 60, become sufficient to require actuation of the automatic power-lift mechanism, thrust is imparted through the top link 48 to the thrust link 130, and the latter, by reason of its connection to the bell-crank 90, actuates the control rod 93 for corresponding operation of the piston 105 as shown in Fig. 5, with consequent actuation of the lift arms 25, pull rods 27, and elevator levers 30. The thrust required to effect such automatic regulation is permitted by corresponding sliding movement of the pin 134 in the hook 132, but during normal operation the overhanging weight of the implement is carried by the hook 132 in a manner somewhat similar to the carrying of the weight by the bracket plates 70 of the form of Figs. 1 to 5.

In the modification of Fig. 8, the thrust link 130 is provided with a downwardly curved rear portion 130a which is attached to the same pivot pin 92 on the bell crank 90 as is used in Fig. 5 to attach the thrust link 50. The operation of the control rod 93 against the compression spring 52 is the same as in the other forms. However, in this case the cross pin 134 lying in the hook 132, and attached to the forward ends of the members of the thrust link 130, carries a forwardly extending rod 140 which projects through an aperture in an upstanding ear 142 on the forward end of the bracket plate 133. The outer end of the rod 140 beyond the ear 142 carries a comparatively heavy compensating spring 144 which is adapted to be compressed to a fixed value by a nut 145 of socket type threaded on the outermost extremity of the rod 140. The spring 144 is set by the nut 145 in accordance with the extra amount of weight presented by the heavy harrow or other implement attached by the hitch. This spring is compressed to the required set compression value when the implement is attached and the apparatus installed, and this value is insured by predetermining the length of the socket portion of the nut 145, necessary for the purpose, and cutting such socket portion down to that length. In this manner, the mentioned extra weight of the given implement is offset, and the lift mechanism correspondingly relieved. If an implement of different weight is subsequently used, the set of the spring 144 is changed by changing the nut 145, or both the spring 144 and the nut 145. Thus, the compression spring 52 responds more readily to the draft reactions of the implement as transmitted through the thrust link 130 and the control rod 93.

In the construction shown in Fig. 8, as well as that of Fig. 6, the draft arms 75 being carried directly upon the transverse draft bar 36, the draft reactions from the harrow or other implement are transmitted through the adjustable rod structure 60, the bearing 68, the top link 128 and thrust link 130, without reliance upon draft applied to an extending lower portion of the A-frame 125.

In each of the three forms above described, the pulling points for the implement from the tractor are the pins 34 provided at the rearward ends of the return arms 35 where the rearward ends of the elevator levers 30 are attached. Also in each form, the balancing of the weight of the harrow 55 for proper disposition of such weight upon the forward gang of discs 57 and upon the rearward gang of discs 58, in order to effect desired earth penetration and eliminate side draft, is accomplished through the necessary lengthening and shortening of the rod structure 60 by means of the hand crank 64 on the threaded shaft 63. Again, in connection with each form, when the harrow 55, or other implement, develops undesirable resistance to forward movement, the apparatus works in compression, that is, causes compression of the spring 52 if the control rod 93 is forced inward to actuate the control lever 102 to effect lifting operation of the piston 105. As above indicated, such operation in compression is effected in the forms of Figs. 1 to 5 through draft of the draft arms 75 upon the extensions of the A-frame 40 where the pivot bolts 78 connect the draft arms 75 thereto, the corresponding thrust being imparted through the telescopic thrust link 50. In the forms of Figs. 6 to 8, wherein the draft arms 75 are attached to the transverse draft bar 36, operation by compression is effected solely through the adjustable rod structure 60, and thence to the top link 128 and the thrust link 130. In these forms, operation by compression, when required, is assisted by the compensating spring 144 to the extent that the rearward weight of the implement, that is the weight which we have termed "overhanging weight," is carried by the portion 15 of the tractor superstructure. When the weight of the harrow 55, or other implement, is properly imposed upon the soil being cultivated, the elevator levers 30 being lowered accordingly, as in the broken line position of Fig. 1, the apparatus is considered as working in tension, the control rod 93 being pulled out to permit expansion of the compression spring 52, such weight disposition being permitted by proper adjustment of the adjustable rod structure 60. In view of the relative angularity of the top links 48 and 128 of the various forms with respect to the elevator levers 30, lowering of the implement tends further toward such operation in tension by reason of the effective lengthening of the top links 48, 128, which constitute supporting links, this effect continuing until such time as increased draft resistance in the rearward portion of the implement tends to cause a buckling through the rod structure 60 with consequent reversal to operation in compression through the thrust link 50 of the form of Figs. 1 to 5 and through the top link 128 and thrust link 130 of the other forms.

In the forms of Figs. 6 and 8, operation in compression is assured by reason of the lost motion connection provided by the hooks 132 in which the cross pins 134 of the thrust links 130 slide.

In Fig. 9 there is shown somewhat diagrammatically the relationship of the various parts of the present hitch to one another and to the tractor to which the device is attached, certain relationships in conjunction with the movements being indicated in broken lines. In this figure, the double A-frame structure provided by the lower A-frame 40 and the upper A-frame 42 of the form of Figs. 1 to 5 is employed, although, in general, the same relationships exist where the single A-frame 125 of the forms of Figs. 6 and 8 is employed. As seen, the pivots 32 for the elevator levers 30 are disposed below the tractor axle 12, and also are desirably disposed slightly forward with respect to such axle. The pivot pin 71 carried by the bracket plate 70 by which the forward end of the rigid top link 48 is attached to the tractor is not only well elevated above the axle 12 and thereby well spaced vertically from the pivots 32, but is also disposed forward of the axle 12, the pivots 32 and the pivot 91 for the bell crank 90.

Thus, a rough parallelogram of forces is provided by the pivots 32, the pivot pin 71, the pivot pin 49 by which the rearward end of the top link 48 is attached to the upper portion of the upper A-frame 42, and the effective points of connection of the draft bar 36 to the elevator levers 30 which are provided by the lugs 38. Since the pivot points 28 by which the pull rods 27 are attached to the elevator levers 30 are located closely adjacent the lifting points provided by the lugs 38, effective leverage to elevate the mechanism is accomplished. Also such disposition of the lifting points provided by the lugs 38 insures attachment of the draft mechanism for the harrow, or other implement, as far forward toward the tractor axle 12 as is possible.

As will be observed from Fig. 9, as well as from Fig. 5, the rigid top link 48 when in ordinary operating position is angled upward as it extends rearward, being thereby somewhat out of parallelism with the lifting levers 30. As a result, when the double A-frame is bodily lifted, the pivot pin 49 swings about the pivot 71 as a center to describe a short arc forward as indicated by the curved arrow 100. This has the effect of swinging the top of the upper A-frame 42 somewhat forward as the lower A-frame 40 is elevated, thereby causing the adjustable rod structure 60, through its attaching pivot 65 to lift the rearward portion of the harrow 55 at a faster rate than the forward portion and into such an angled position as indicated by the broken lines. This lifting of the rearward portion of the harrow and its rear gang of discs 58 to a greater elevation than the forward portion of the harrow and its forward gang of discs 57 has considerable advantage for the purpose of transport. This advantage is due to the fact that, as the tractor moves over rough ground, the overhanging rear gang of discs 58 has greater freedom of movement without striking the earth or roadway. Since the point of attachment for the forward end of the top link 46, provided by the pivot pin 71, is placed well forward on the tractor toward the center of gravity thereof and forward of the tractor axle 12, the overhanging weight of the rear portion of the arrow is efficiently transferred to the tractor itself and thence to the tractor wheels.

As illustrated in Fig. 10, the mounting of the upper A-frame 42 with respect to the lower A-frame 40 may be accomplished by pivoting the lower ends of its legs 43 directly upon the transverse draft bar 36, instead of mounting it upon the lower A-frame by means of the pivot bolts 44 of the form of Figs. 1 to 5.

In connection with the construction shown, it is to be noted that means are provided to facilitate retention of the parts in assembled relationship when necessary to change implements. Thus, the forward angle iron 76, which may be adapted for attachment to various types of implements, may be disconnected from the forward portion of the harrow frame 55 as by the removal of the bolts 76a (Fig. 2). When this has been done, the tendency of the draft arms 75 and the weight box provided therein is to swing downward. The amount of this swinging movement is limited by rearwardly extending lugs 175, Fig. 5, which are carried on the rearward edges of the lower ends 40a of the legs of the lower A-frame 40, these lugs 175 lying in the path of the draft arms 75 when they begin to swing downward. Similarly, the cross bolt 89 in the thrust link 50 prevents the sleeve member 85 from being disconnected from the link member 87.

Other variations of the generic invention here disclosed will become apparent to those skilled in this art, and we therefore intend to protect all modifications which fall within the scope of the claims.

We claim as our invention:

1. In combination in a hitch structure for connecting a drawn implement frame to a tractor having a superstructure and having elevating means to raise and lower the drawn implement frame, power-lift mechanism connected with said elevating means, automatic control means for the power-lift, and draft arms connected to a lower portion of said tractor and to said elevating means for lifting said implement frame through said draft arms, the combination including: an upstanding rigid frame; means connecting a lower portion of said frame with said draft arms for elevation thereby; link means connecting an upper portion of the upstanding frame with a rearward portion of said implement frame, and link means connecting an upper portion of said upstanding frame with a rigid location on said tractor superstructure above said draft arms to transfer a portion of the weight and strain of the rear of said implement frame to the upper portion of said tractor through said upstanding frame and said rigid location; a second upstanding rigid frame; means connecting said second frame with said draft arms for support thereon; means pivotally connecting the lower portion of said second frame to a forward portion of the implement frame for support of the latter on said second frame; and a thrust link pivotally connected with an upper portion of said second upstanding frame and connected with said automatic control means to control said power-lift mechanism and lift said draft arms.

2. A combination as in claim 1 wherein the lower part of the first mentioned upstanding frame is pivoted on the second upstanding frame.

3. A combination as in claim 2 wherein the connection of said second frame with said draft arms includes a pivotal connection.

4. A combination as in claim 1 wherein said connection of said second frame includes a pivotal connection.

5. A combination as in claim 1 wherein the forward end of said implement frame is pivotally connected to the lower portion of said second upstanding frame, and an intermediate portion of said second frame is provided with a cross shaft providing for the connection of said second frame with said draft arms, the ends of said cross shaft having thereon jaw means which engage with the upper and lower edge portions of intermediate parts of said draft arms, and short arms carrying said jaw means and extending rearwardly and connected to the rearward ends of said draft arms whereby said draft arms pull said implement frame through said short arms, said cross shaft and said second upstanding frame.

6. In combination in a hitch structure for connecting a drawn implement frame to a tractor having a super-structure and having elevating means to raise and lower the drawn implement frame, and also having power-lift mechanism connected with said elevating means, automatic control means for the power lift, and draft arms connected to a lower portion of said tractor and to said elevating means for lifting said implement frame through said draft arms, the combination including: an upstanding rigid frame whose lower portion is connected with said draft arms for elevation thereby; link means connected to and leading upward from a portion of said implement frame to and directly connected with an upper portion of said upstanding rigid frame for supporting weight of said implement frame and its implement from the upper portion of said upstanding rigid frame; a tension link connecting an upper portion of said upstanding frame with a rigid location on said tractor superstructure above said draft arms to transfer strain of said weight of said implement frame and its implement to the upper portion of said tractor through said upstanding frame and said rigid location; a second upstanding rigid frame connected with the first upstanding rigid frame and also supported by said draft arms for elevation thereby; means rigidly connected with said implement frame and pivotally connecting said implement frame with said second upstanding rigid frame for support of said implement frame on said second frame; and thrust link means pivotally connected with an upper portion of said second upstanding frame and also connected with said automatic control means to control said power-lift mechanism for lifting said draft arms and said upstanding rigid frames.

7. A combination as in claim 6 wherein said thrust link means includes a lost-motion connection permitting elongation upon elevation of said upstanding frame.

8. In combination in a hitch structure for connecting a drawn implement frame to a tractor having a superstructure and having elevating means to raise and lower the drawn implement frame, power-lift mechanism connected with said elevating means, automatic control means for the power-lift, and draft arms connected to a lower portion of said tractor and to said elevating means for lifting said implement frame through said draft arms, the combination including: arm means rigidly attached to said implement frame to support the implement; thrust link means connected with said automatic control means to control said power-lift mechanism and lift said draft arms; a first upstanding rigid frame having a portion pivotally connected directly to said thrust link means, said implement-supporting arm means being pivotally connected directly on said upstanding rigid frame for support of said implement on said upstanding rigid frame; a second upstanding rigid frame pivotally connected with the first upstanding rigid frame and thereby having supporting connection with said draft arms; second link means connecting the upper portion of said second upstanding rigid frame with a rigid location on said tractor superstructure above said draft arms to transfer weight strain of said implement frame and its implement to the upper portion of said tractor through said second frame and said rigid location when said rigid frames and implement frame are elevated by said power lift, said elevating means and said draft arms; and means interconnecting an upper portion of said second upstanding rigid frame and said implement frame for lifting said implement frame with said upstanding frames by said elevating means and said draft arms through said interconnecting means.

HOWARD B. RAPP.
LOYD E. HECKATHORN.

References Cited in the file of this patent

UNITED STATES PATENTS

| Number | Name | Date |
|---|---|---|
| 2,077,942 | Lindgren | Apr. 20, 1937 |
| 2,159,669 | Morkoski | May 23, 1939 |
| 2,312,258 | Martin | Feb. 23, 1943 |
| 2,322,342 | Bunn | June 22, 1943 |
| 2,337,801 | Cook | Dec. 28, 1943 |
| 2,349,257 | Evans et al. | May 23, 1944 |
| 2,398,147 | McKay | Apr. 9, 1946 |
| 2,414,114 | Martin | Jan. 14, 1947 |
| 2,441,630 | Heitshu | May 18, 1948 |
| 2,456,693 | Fraga | Dec. 21, 1948 |
| 2,575,622 | Fraga | Nov. 20, 1951 |